Patented Mar. 16, 1926.

1,577,057

UNITED STATES PATENT OFFICE.

GUY H. BUCHANAN, OF WESTFIELD, NEW JERSEY, ASSIGNOR TO AMERICAN CYANAMID COMPANY, OF NEW YORK, N. Y., A CORPORATION OF MAINE.

METHOD OF AND MEANS FOR STABILIZING LIQUID HYDROCYANIC ACID.

No Drawing.    Application filed September 16, 1925.   Serial No. 56,745.

*To all whom it may concern:*

Be it known that I, GUY H. BUCHANAN, a citizen of the United States, and a resident of Westfield, in the county of Union and State of New Jersey, have invented a new and useful Improvement in Methods of and Means for Stabilizing Liquid Hydrocyanic Acid, of which the following is a specification.

This invention relates to liquid hydrocyanic acid, more particularly to the stabilization and preservation thereof.

In recent years liquid hydrocyanic acid has become an important article of commerce, being used very extensively for fumigation purposes, particularly for the fumigation of citrus trees and the like. The liquid is filled into metal cans or steel cylinders similar to those used for the storage of other liquefied gases, and is shipped therein to the point of use. The hydrocyanic acid of commerce is not absolutely pure and it contains a small amount of water, usually about 3% or 4%.

As is well known, hydrocyanic acid is a very reactive substance, and, therefore, is rather unstable; and difficulty has sometimes arisen by reason of decomposition of liquid that had been in storage for a considerable length of time, that is, upwards of six months to a year. The pure anhydrous acid as well as mixtures with water, if pure, may be kept for some time without alteration, but if small amounts of alkali are present the acid rapidly decomposes, the color changing to dark brown, and it finally deposits dark brown flocks of "azulmic acid." The alkali may be that originally present in the acid incident to the process of manufacture, or it may be ammonia derived from the decomposition of hydrocyanic acid. This decomposition may be prevented by the addition of a small quantity of a mineral acid, such as sulphuric acid, but the amount of such acid which may be added is limited on account of the resulting corrosion of the apparatus used in storing and applying the hydrocyanic acid.

My invention is intended and adapted to prevent the above described changes which may occur in liquid hydrocyanic acid on extended storage, it being among the objects thereof to provide a method of and a means for stabilizing liquid hydrocyanic acid, which shall be simple, effective to preserve the acid over long periods of time, and which shall not materially alter the characteristics thereof, thereby retaining in full the usefulness of the acid for fumigation and other purposes.

In practicing my invention, I provide liquid hydrocyanic acid of commerce, containing from 3% to 10% of water, and instead of making it acid with sulphuric acid or the like, I add thereto a small amount of a halogen compound of hydrocyanic acid, such as cyanogen chloride. The amount of of cyanogen chloride added may vary within wide limits, with the result of perfectly preserving the liquid hydrocyanic acid for long periods of time under the most adverse circumstances, without the slightest trace of decomposition being apparent.

I have made a considerable number of experiments with mixtures of hydrocyanic acid and cyanogen chloride as a result of which I found that it was fessible to add cyanogen chloride in the liquid state to the liquid hydrocyanic acid to be used for fumigation, whereby the cyanogen chloride, because of its lachrymal effect, acts as a warning and drives out any human beings who may accidentaly be present in the area being fumigated. A suitable mixture for this purpose was found to contain 10% to 15% cyanogen chloride, about 80% to 86% hydrocyanic acid and about 2% to 4% water, as set forth in my copending application Serial No. 3,504, filed Jan. 19, 1925, for fumigant and method of fumigating. I have also found that the addition of cyanogen chloride lowers the freezing point of the hydrocyanic acid to a marked degree, giving a eutectic mixture that melted at about −45.5° C., as described in my copending application Serial No. 33,627, filed May 29, 1925, for cyanogen chloride-hydrocyanic acid mixtures.

In continuing my study of such mixtures I experimented on the effect of smaller amounts of cyanogen chloride on liquid hydrocyanic acid. I took a sample of such liquid hydrocyanic acid containing 2.5% to 3% of water and divided it into a number of parts, placing these in glass bottles. To certain of these I added 0.5%, 1%, 2%, 5% and 10% of cyanogen chloride; others I made wthout any such addition. All the bottles were then exposed to direct sunlight, which is recognized as a condition of storage more severe than those encountered in practice. The bottles containing the untreated portions began to turn brown, and showed extensive decomposition at the end of six weeks. All portions treated with cyanogen chloride, even that to which only 0.5% had been added, remained perfectly clear and colorless, showing that no decomposition had taken place.

As a result of these experiments I have concluded that cyanogen chloride, even in very small amounts, is an excellent stabilizer for hydrocyanic acid.

I am unable to state definitely the reason for the stabilizing effect of cyanogen chloride but it is reasonable to assume that hydrocyanic acid, even if substantially pure, and especially that of commerce, will start to decompose to a slight extent spontaneously because of its activity and relative instability, resulting in the formation of a minute amount of ammonia. The alkali thus formed acts as a catalyst speeding up the decomposition of the hydrocyanic acid, which goes on progressively faster. It may be that cyanogen chloride, under similar conditions, decomposes slightly with the production of a minute amount of hydrochloric acid, which combines with the minute amount of ammonia formed in the decomposition of the hydrocyanic acid, neutralizing the same, and thus keeping the rate of decomposition thereof down to a negligible quantity. Or it may be that the ammonia combines with the cyanogen chloride in some other way. Also it is possible that the cyanogen chloride acts as a negative catalyst slowing down or preventing the decomposition of hydrocyanic acid. Whatever the mechanism of the action, the cyanogen chloride is a remarkable stabilizer for hydrocyanic acid, and it does not materially change the characteristics of the fumigant because of its similarity to hydrocyanic acid, and also because of the small amount used.

Although I have described my invention, giving an example which shows that as little as 0.5% of cyanogen chloride will stabilize hydrocyanic acid, I may use even less and still obtain good results. It appears that as little as 0.1% to 0.2% has a stabilizing effect. A series of mixtures containing liquid hydrocyanic acid, water and amounts of cyanogen chloride, varying from 0.2% to 0.8%, were prepared and placed in bottles and exposed to sunlight, together with bottles of the original hydrocyanic acid, which were similarly exposed for the purpose of comparison. After eight weeks of exposure to direct sunlight the material containing hydrocyanic acid alone was completely decomposed while all the bottles containing cyanogen chloride, even that bottle which contained only 0.2% of cyanogen chloride, were as clear and colorless as when first exposed. It is therefore apparent that even very small amounts of cyanogen chloride, much less than 0.5% will wholly prevent the decomposition of hydrocyanic acid.

In place of the cyanogen chloride, the polymer thereof, cyanuric chloride, may be used. A series of mixtures of hydrocyanic acid, water and 0.5%, 1% and 2% cyanuric chloride were prepared and were exposed as previously stated to the action of sunlight, together with samples containing no cyanuric chloride, for comparison. The last mentioned samples began to show indications of decomposition in a few days and in about six weeks were completely decomposed. Even after ten weeks of exposure the samples containing the cyanuric chloride were all unchanged.

By the employment of cyanogen chloride as described above I have found it unnecessary to add strong corrosive acids to hydrocyanic acid for stabilization and I thereby avoid the corrosive action of such acids on the containers and apparatus used in the application thereof.

My invention is not limited to the chlorine derivatives of hydrocyanic acid as other halogen derivatives may be substituted therefor, except that the chlorine compounds are relatively less expensive than the other halogen compounds and they are more readily available. The amounts thereof which may be used vary within wide limits with good results, but I believe that about 1% thereof should be sufficient for stabilization in most cases. These and other changes may be made in my invention, the scope of which is defined in the claims appended hereto.

What I claim is:

1. A method of stabilizing liquid hydrocyanic acid which comprises adding thereto a small amount of a halogen compound thereof.

2. A method of stabilizing liquid hydrocyanic acid which comprises adding thereto a small amount of a chlorine compound thereof.

3. A method of stabilizing liquid hydrocyanic acid which comprises adding thereto a small amount of cyanogen chloride.

4. A method of stabilizing liquid hydrocyanic acid which comprises adding thereto a small amount of cyanogen halide.

5. A method of stabilizing liquid hydrocyanic acid which comprises adding thereto less than 10% of cyanogen chloride.

6. A method of stabilizing liquid hydrocyanic acid which comprises adding thereto 0.1% to 10% of cyanogen chloride.

7. A method of stabilizing liquid hydrocyanic acid which comprises adding thereto about 1% of cyanogen chloride.

8. A mixture comprising liquid hydrocyanic acid, and less than 10% of a cyanogen halide.

9. A mixture comprising liquid hydrocyanic acid and 0.1% to 10% of cyanogen chloride.

10. A mixture comprising liquid hydrocyanic acid, less than 10% of cyanogen chloride, and a small amount of water.

11. A mixture comprising liquid hydrocyanic acid, 0.1% to 10% of cyanogen chloride, and less than 10% of water.

12. A mixture comprising liquid hydrocyanic acid and about 1% of cyanogen chloride.

In testimony whereof, I have hereunto subscribed my name this 14 day of September, 1925.

GUY H. BUCHANAN.